United States Patent [19]

Sturwold et al.

[11] 4,122,217

[45] Oct. 24, 1978

[54] PREVENTION OF WATER STAINING OF ALUMINUM

[75] Inventors: Robert J. Sturwold; Walter Earl Utz, both of Cincinnati, Ohio; Nicholas Christ, Richmond, Va.; William R. Ford, Jr., Richmond, Va.; George P. Koch, Richmond, Va.

[73] Assignees: Emery Industries, Inc., Cincinnati, Ohio; Reynolds Metals Co., Richmond, Va.

[21] Appl. No.: 832,258

[22] Filed: Sep. 12, 1977

Related U.S. Application Data

[63] Continuation of Ser. No. 602,816, Aug. 7, 1975, abandoned.

[51] Int. Cl.$^2$ ............................................. C21D 1/00
[52] U.S. Cl. .................................. 427/156; 427/178; 427/383 C; 427/421
[58] Field of Search ................... 427/388 R, 156, 178, 427/383, 421

[56] References Cited

U.S. PATENT DOCUMENTS 2,767,144 10/1956 Gottshall et al. ...................... 252/57

*Primary Examiner*—Bernard D. Pianalto
*Attorney, Agent, or Firm*—Gerald A. Baracka; John D. Rice

[57] ABSTRACT

This invention relates to a method for protecting aluminum and aluminum alloy products against water staining. The method involves applying a continuous film of a protective composition to the surface of the aluminum product. The protective compositions useful for the invention are blends or reaction products of a polybasic acid and a partial ester of a polyol.

15 Claims, No Drawings

PREVENTION OF WATER STAINING OF ALUMINUM

This is a continuation of application Ser. No. 602,816 filed Aug. 7, 1975 and now abandoned.

BACKGROUND OF THE INVENTION

Most unprotected metal surfaces are subject to oxidative attack upon exposure to the atmosphere. The extent of oxidation and the form of deterioration (e.g. rusting, corrosion, discoloration, loss of lustre, staining and spotting, etc.) varies depending on the metal and the nature and severity of the conditions to which the metal is exposed.

Aluminum and high aluminum-content alloy products are particularly susceptible to oxidation in the form of water staining. Water stains, probably oxides and hydroxides of aluminum, appear as whitish blemishes on the surface of the metal and in extreme cases surface pitting is also noted. The problem is not limited to exterior surfaces. Even with tightly rolled coils of aluminum sheet, moisture can condense at metal interfaces within the roll if the coil is exposed to atmospheric changes during shipment or outdoor storage, causing water staining throughout the coil and making it necessary to return the roll to the manufacturer for reprocessing.

In addition to objectionable appearance, the presence of water stains cause numerous problems in subsequent fabricating operations such as rolling, stamping, drawing, extruding, cutting, welding, electroplating, lacquering and printing. Water stains on the surface of aluminum sheet cause frictional pickup on rolls and slipping and skidding of the sheet resulting in surface defects, considerable downtime, and operation of the mill at less than optimum speeds. Also, there may be considerable breakage in the production of thin films. In drawing operations, such as the production of beverage cans, pickup and galling of the die occur if the aluminum is water stained. Even if it is possible to form an acceptable can with water-stained aluminum application of color and print on the can may be less than satisfactory.

Several approaches have been used by the aluminum industry to eliminate, or at least minimize, the water staining problem. In some instances the metal is stored under conditions which deter the formation of water stains. This is not practical, however, with large quantities of metal produced in a typical mill or where the metal must be shipped to a different location for final processing. The use of protective coatings is presently considered to be the most practical solution to the problem. Known protective coatings previously available to the industry have not been completely satisfactory, however, due to the numerous requirements which these products must satisfy.

In addition to providing a protective hydrophobic barrier on the surface of the aluminum, the coating must not interfere with subsequent fabrication and processing of the metal. It must also satisfy a number of other important criteria. First, it is essential that the protective composition not stain or otherwise attack the surface of the metal under conditions of application. Also, the protective composition must be capable of forming a continuous film on the metal surface which in some cases is uneven and irregular. The protective composition should be effective at low concentration and be in a form suitable for application to metal surfaces moving at high rates of speed. Since to facilitate application inert diluents are usually employed, the protective composition should have good compatibility with commonly used diluents and low volatility so that when the diluent evaporates a continuous film of the protective composition will remain on the metal surface to provide protection against stain. It is equally important, however, that the protective material not form such a permanent film that it cannot be removed by subsequent annealing. If the product is "burned-off" ash formation should be negligible.

SUMMARY OF THE INVENTION

We have now quite unexpectedly discovered that a blend or reaction product of a polybasic acid and polyol partial ester can be applied to aluminum and aluminum alloys to protect against water staining. The protective compositions of this invention generally satisfy all the aforementioned requirements and can be used in neat form or combined with an inert diluent and applied as a protective oil.

The protective compositions of the present invention are a blend or the complete or partial reaction product of (1) aliphatic or cycloaliphatic polybasic acids containing 18 or more carbon atoms and 2 to 4 carboxyl groups per molecule and (2) polyol partial esters derived from aliphatic or ether polyols containing from 3 to 30 carbon atoms and 3 to 22 hydroxyl groups and a $C_{12-22}$ aliphatic monocarboxylic acid. Application of a continuous film of said compositions to the surface of aluminum products provides effective protection against water staining even under severe conditions.

Useful polybasic acids for preparation of the protective compositions of this invention contain 18 to 72 and, more usually, 21–54 carbon atoms. Especially useful polybasic acids are the commonly called dimer acids obtained from the polymerization of unsaturated $C_{16-26}$ monocarboxylic acids. Superior results are obtained when $C_{36}$ dimer acids containing less than 25 wt. % trimer and higher polymer acids are employed. Polyol partial esters of aliphatic polyols and ether polyols containing 3 to 12 carbon atoms and having 3 to 10 hydroxyl groups esterified with a $C_{14-20}$ fatty acid or mixture are also preferably used.

The weight ratio of polybasic acid to polyol partial ester will range between about 20:1 and 1:4 and the protective compositions will have hydroxyl values greater than about 15, and more preferably from about 25 to 200. If the components are blended the weight ratio preferably ranges from 5:1 to 1:2 whereas if the components are reacted the preferred range is from 3:1 to 1:3. At least about 0.5 mg of the protective composition is required per square foot of metal surface to obtain effective water stain protection. The protective compositions exhibit excellent solubility in aliphatic and aromatic hydrocarbons and protective oils containing as little as 0.1 wt. % of the protective composition can be advantageously utilized. Protective oils prepared from aliphatic and aromatic hydrocarbons having 100° F. viscosities of 20–100 SUS and which contain 0.5 to 10% by weight of the protective composition are particularly useful for application to the metal surface by spraying. Blends or partial reaction products of $C_{36}$ dimer acid containing less than 25% trimer and higher polymer acids and polyol partial esters derived from glycerol, trimethylolpropane, pentaerythritol, di-, tri- and tetraglycerol and di-, tri- and tetrapentaerythritol and $C_{18}$ fatty acids and fatty acid mixtures form an especially preferred embodiment of this invention.

DETAILED DESCRIPTION

In its broadest terms the present invention relates to useful protective compositions, to a method for the prevention of water staining of aluminum and aluminous metals and to the resulting improved products obtained thereby. By the method of this invention a protective composition, which is the complete or partial reaction product or blend of a polybasic acid containing 18 or more carbon atoms and a partial ester of a polyol, is applied to the surface of the metal. The protective compositions are applied, either in neat form or with a suitable diluent to castings, forgings, drawn and stamped products, extrusions, sheets and foils etc. and form a continuous film on the surface of the metal product which is effective to prevent the formation of water stains.

The terms "aluminum" and "aluminous metal" are used interchangeably herein and refer to aluminum metal, pure and in its more usual form containing trace amounts of impurities such as iron, silicon, copper, magnesium and the like, and the various aluminum alloys generally containing 80% by weight or more aluminum. Alloys for which the compositions of this invention are useful include, for example aluminum-copper, aluminum-silicon, aluminum-magnesium, aluminum-magnesium-silicon, aluminum-manganese-magnesium, aluminum-zinc-magnesium-copper, aluminum-zinc-magnesium-lithium, aluminum-zinc-magnesium-lithium-copper and aluminum-magnesium-silicon-beryllium.

The term "protective composition" as employed herein refers to the blend or partial or complete reaction product of the polybasic acid and polyol partial ester whereas the term "protective oil" refers to the protective composition in combination with a diluent. While the protective composition can be used per se, that is, in neat form, application is often facilitated by using a suitable solvent, carrier or base oil to dilute the protective composition to a desired concentration. Application of the protective composition to the aluminum surface can be accomplished by dipping, brushing, spraying, wiping, roller coating or using any other method capable of applying the minimum level necessary to prevent water staining. The use of a diluent can also be useful to adjust the viscosity to meet the requirements of a particular method of application.

The choice of diluent is limited only by the need for the material to be inert, that is, essentially unreactive with the protective composition, the metal or any additional additives present in the protective oil formulation. Aside from this consideration any liquid satisfying the requirements of the particular application method can be used. Numerous organic liquids including aliphatic and aromatic hydrocarbons, alcohols, ketones and esters can be used for this purpose as will be recognized by those skilled in the art. By controlling conditions water can even be used as the diluent. This is possible in situations where the contact time of the diluent on the metal is very short and/or during the period of contact with the diluent the conditions are not conducive to staining.

Aliphatic and aromatic hydrocarbons are especially useful diluents for this invention. These products are preferred since they are commercially available and the protective composition are readily soluble therein to produce homogeneous solutions. These hydrocarbons are also quite volatile and thus can be easily removed after application leaving a continuous film of the protective composition on the surface of the aluminum. The hydrocarbon can, in addition to serving as a diluent and carrier, also impart desirable lubrication properties to the protective oil formation. Useful aliphatic and aromatic hydrocarbons and hydrocarbon mixtures have 100° F. viscosities of 20 to 100 SUS and, more usually, 30 to 80 SUS. They typically have flash points above about 115° F. and, more generally, greater than 175° F. Useful synthetic hydrocarbon oils are obtained by oligomerizing olefins containing up to about 20, and more usually from about 8 to 16, carbon atoms per molecule in the presence of peroxide or Friedel-Crafts (e.g. aluminum alkyl) catalysts. More commonly the useful hydrocarbons are obtained by distillation of crude oils in accordance with procedures known to the art which may additionally include an acid or solvent refining step. Hydrocarbon oils designated as mineral seal oils which have viscosities and boiling ranges between kerosene and gas oils are especially useful for the preparation of multi-purpose protective oil systems. Additional additives such as stabilizers, fungicides, bacteriocides and the like may be included in these protective oil formulations.

Polybasic acids useful in the preparation of the protective compositions of this invention are aliphatic or cycloaliphatic hydrocarbon acids containing 18 or more carbon atoms and 2 to 4 hydroxyl groups per molecule. The acids may be straight-chain or branched with one or more alkyl groups and the carboxyl groups can be located in terminal positions ($—CH_2COOH$) or randomly throughout the molecule ($—CHCOOH$). While the useful polybasic acids can contain from about 18 to 72 carbon atoms, more preferably they will be $C_{21-54}$ acids or mixtures thereof. Since high molecular weight polybasic acids are typically obtained as mixtures they will generally contain some monobasic acids formed as reaction intermediates or due to incomplete reaction. The monobasic acid content will not, however, exceed about 15% by weight of the acid mixture and more usually will be less than 8%.

Polybasic acids useful for this invention are obtainable employing conventional methods known to the industry. The polybasic acid may be obtained by the oxidation of hydrocarbons, for example, by ozonolysis of $\alpha, \Omega$ unsaturated hydrocarbons or other di- or multi-olefinic materials or by catalytic oxidation of saturated and/or unsaturated hydrocarbons. Also, it is possible to obtain suitable polybasic acids by oxidation of methyl- or formyl-branched acids, such as isostearic acid or formylstearic acid. Carboxystearic acids such as heptadecane-1,8-dicarboxylic acid, heptadecane-1,9-dicarboxylic acid, as well as other isomeric acids, are produced in this manner. Useful polybasic acids are also formed by the addition of acrylic acid or methacrylic acid to a monobasic acid containing conjugated unsaturation (e.g. linoleic acid). When linoleic acid (9,11-octadecadienoic acid) and acrylic acid are reacted a dibasic acid of the formula

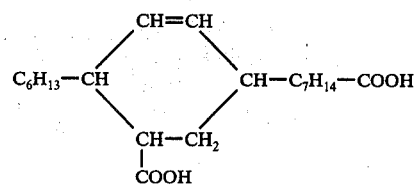

is obtained.

An especially useful method for producing the polybasic acids utilized in the present invention is the polymerization of unsaturated monocarboxylic acids containing from about 16 to 26 carbon atoms such as, for example, oleic acid, linoleic acid, ricinoleic acid, linolelaidic acid, linolenic acid and eleostearic acid. The acids produced in this manner are generically referred to as polymeric fatty acids or polymer acids and more specifically designated as dimer acid, trimer acid, tetramer acid, etc. depending on the degree of polymerization.

Methods known for the preparation of these polymer acids include (a) treatment of unsaturated fatty acids with acid catalysts such as HF, $BF_3$, $SnCl_3$, $AlCl_3$, and the like; (b) treatment of unsaturated fatty acids with electrical charges; (c) treatment of fatty acids with peroxides; (d) thermal treatment of fatty acids containing unsaturation; and (e) heating unsaturated fatty acids in the presence of treated or untreated catalysts. The above procedures as well as other less frequently used techniques for the preparation of polymeric fatty acids are well known and described in the literature.

Dimer acids (polymer acids obtained by reacting two fatty molecules) of $C_{18}$ acids, such as oleic acid, linoleic acid or mixtures thereof (e.g. tall oil fatty acids), are especially useful and advantageously employed in the preparation of the protective compositions of this invention. Polymer acids having as their principal component $C_{36}$ dimer acid are commercially available under the trademark "Empol" and have the following specifications:

Acid value: 180–215
Saponification value: 190–205
Neutral equivalent: 265–310

Dimer acids containing less than 25 wt. % trimer or higher polymer acids provide especially useful protective compositions in accordance with the present invention. If desired, polymer acids containing unsaturation can be hydrogenated prior to use for the preparation of the protective composition.

A partial ester of a polyol is blended or reacted with the above-described polybasic acids in the preparation of the protective compositions. Polyol partial esters are obtained by the esterification of a polyol with less than an equivalent amount of a fatty (monobasic) acid. For this invention the polyols have no more than 70% of the available hydroxyl groups esterified and, more usually, less than 50% of the hydroxyl groups are converted to fatty ester moieties. Some of the hydroxyl groups may also be ethoxylated. Useful polyols for the preparation of the partial esters are aliphatic polyols and ether polyols, i.e., polyols containing one or more ether groups, containing from about 3 to 30 carbon atoms and 3 to 22 hydroxyl groups and, more preferably, from 3 to 12 carbon atoms and 3 to 10 hydroxyl groups.

Especially useful aliphatic polyols for the invention include glycerol, trimethylolethane, trimethylolpropane, pentaerythritol, sorbitol, mannitol, and the like. Ether polyols formed from two or more aliphatic polyol molecules or by ethoxylation are also useful for this invention. Ether polyols obtained by the condensation and elimination of water are typically derived from glycerol, pentaerythritol, sorbitol, mannitol and include such ether and polyether polyols as diglycerol, triglycerol, tetraglycerol, dipentaerythritol, tripentaerythritol, tetrapentaerythritol and the like. When a specific ether or polyether polyol is mentioned it is generally understood that a mixture of condensation product is present but that the average molecular weight corresponds most closely to the specified ether polyol. The fact that these polyols are mixtures does not affect the subsequent esterification nor does it detract from the antistaining properites or other general protective properties or the compositions of this invention.

It is also possible to use ether polyols obtained by ethoxylation of the above-mentioned aliphatic, ether or polyether polyols. The degree of ethoxylation may range from 1 up to about 40 or more condensed ethylene oxide units. The ethoxylation may occur as a single hydroxyl function or two or more of the hydroxyl groups may be reacted with the ethylene oxide. While the extent of ethoxylation will be governed primarily by the particular polyol and fatty acid employed in the preparation of the polyol partial ester it will most usually range from about 5 to 20 condensed ethylene oxide units.

Acids employed in the preparation of the polyol partial ester are aliphatic monocarboxylic acids (fatty acids) containing from about 12 to 22 carbon atoms and, more preferably, from about 14 to 20 carbon atoms. The fatty acid may be branched- or straight-chain and can be saturated or contain unsaturation. Such acids include, for example, lauric acid, myristic acid, palmitic acid, margaric acid, stearic acid, oleic acid, linoleic acid, linolenic acid, ricinoleic acid, eleostearic acid, arachidic acid, behenic acid and mixtures thereof such as are obtained by hydrolytic splitting of natural fats and oils.

To illustrate the useful polyol partial esters obtained in accordance with the above-description, the following partial listing of fatty acid partial esters of polyols and ether polyols is provided:

trimethylolethane monooleate
trimethylolethane dioleate
trimethylolpropane monooleate
trimethylolpropane monostearate
trimethylolpropane dioleate
glycerol monopalmitate
glycerol monostearate
glycerol monoisostearate
glycerol monooleate
glycerol dioleate
glycerol diisostearate
diglycerol dioleate
diglycerol trioleate
triglycerol dioleate
triglycerol diisostearate
POE (10) triglycerol diisostearate
POE (5) glycerol monostearate
POE (5) glycerol monooleate
pentaerythritol monopalmitate
pentaerythritol monooleate
pentaerythritol monoisostearate
pentaerythritol dioleate
dipentaerythritol monooleate
dipentaerythritol dioleate tripentaerythritol dioleate
sorbitan monolaurate
sorbitan monopalmitate
sorbitan monostearate
sorbitan monooleate
sorbitan diooleate
sorbitan diisostearate
sorbitan trioleate
sorbitan tristearate
POE (5) sorbitan monooleate
POE (20) sorbitan monooleate
POE (5) sorbitan monolaurate
POE (20) sorbitan monopalmitate
POE (20) sorbitan monostearate
POE (20) sorbitan tristearate
POE (5) sorbitan trioleate
POE (10) sorbitan trioleate In the above list the POE denotes polyoxyethylene and the number within the parenthesis indicates the moles of ethylene oxide reacted per mole of polyol.

Particularly useful polyol partial esters are derived from glycerol, di-, tri- or tetraglycerol, trimethylolpropane, pentaerythritol, di-, tri and tetrapentaerythritol and $C_{18}$ fatty acids such as stearic, isostearic, oleic and linoleic acids or combinations of these acids. Protective compositions exhibiting a high degree of water stain protection for aluminum products even under severe conditions are obtained by blending or partially reacting these preferred polyol partial esters with polybasic acids containing 75% by weight or more $C_{36}$ dimer acid. These preferred protective compositions are also readily combined with hydrocarbon oils to form especially useful protective oils. Blends and the reaction products of $C_{36}$ dimer acid with glycerol monooleate, trimethylolpropane monooleate and pentaerythritol monooleate are especially useful for this invention because of the superior surface protection afforded by these compositions.

The ratio of the polybasic acid and polyol partial ester can be varied without detracting from the utility of the products of this invention. The weight ratio of these components is governed primarily by the polybasic acid and polyol partial ester used and whether the components are to be blended or reacted. Weight ratios (polybasic acid:polyol partial ester) generally range between about 20:1 and 1:4 and, more preferably, from 5:1 to 1:2 when the components are blended and 3:1 to 1:3 if the components are reacted. These latter ratios are particularly effective with protective compositions derived from $C_{36}$ dimer acid and partial $C_{18}$ fatty acid esters of mono-, di-, tri- or tetraglycerol, trimethylolpropane or mono-, di-, tri- or tetrapentaerythritol, especially where the components are reacted prior to application.

The protective compositions of this invention have hydroxyl values greater than about 15 and, more preferably, from about 25 to 200. The presence of free hydroxyl groups is desirable with both the blended and reacted compositions. It is believed that the hydroxyl groups improve wettability of the metal surface enabling the formation of a continuous protective film even under less than ideal conditions such as when a rapidly moving sheet is sprayed with a protective oil containing low levels of the protective composition. It is also possible that the hydroxyl groups react to some extent with the polybasic acid and/or the surface of the metal upon application, particularly if applied to a hot aluminum surface.

Since useful protective compositions are obtained by either blending or reacting the polybasic acid and polyol partial ester, the decision as to whether the blended or reacted type protective composition will best satisfy the requirements of a particular application necessarily involves a consideration of all the operational variables as well as evaluation under actual operation conditions. In general, however, it is noted that the solubility of the protective compositions in hydrocarbons can be improved by partially reacting the components. If the components are reacted, the extent of reaction can vary from complete reaction to essentially no reaction depending on the result desired and other factors. It will be evident to those skilled in the art, however, that the reaction cannot be carried to completion in all instances and still satisfy the hydroxyl value requirements of the system. Furthermore, it is generally found that no particular advantage is realized by taking the reaction above about 80% completion (based on the limiting component) even if it is possible to achieve the desired hydroxyl value.

As has already been pointed out the protective compositions can be employed in neat form or in combination with a suitable diluent such as mineral seal oil. Concentrations as low as 0.1 wt. % of the protective composition in the oil provide effective water stain inhibition. The only requirement with regard to the concentration is that sufficient protective composition be present in the oil to form a continuous protective film on the surface of the metal under the prevailing application conditions. A discontinuous film will result in areas susceptible to water staining. At least about 0.5 milligram of the protective composition per square foot of surface is required to obtain a continuous film sufficient to prevent water staining under extreme conditions. Of course, larger amounts can be applied to insure acceptable results and provide a safety factor. Employing appreciably more than the minimum required concentration, however, is not economically practical unless the unused oil is collected and recycled. In operations where application is made by spraying onto the rapidly moving sheet, the concentration of the protective composition in the oil will generally range from about 0.5 to 10% by weight since at these levels the viscosity of the oil is acceptable for this type of application and extremely effective metal protection is obtained.

The protective or protective oil is applied using conventional methods such as by spraying, wiping, brushing or rolling the material onto the surface of the metal or by passing the aluminum product through a bath of the protective material. Application can be made either directly to the metal surface or the protective material can first be applied to a roll or similar device and then transferred to the metal surface. Application can be made at any stage of the production prior to exposure to conditions which promote the formation of water stains. The protective composition can be applied, as part of another operation, for example, during cold rolling or slitting, cutting, trimming or similar operations. Application can also be made as a separate step such as where a coil is unwound, coated with the protective composition and then rewound.

The protective compositions of this invention are compatible with numerous other products used by the industry and are readily formulated with other additives and oils to provide formulations which in addition to being useful for water stain inhibition, have ancillary utility. For example, the protective compositions of the invention can be suitably formulated to provide a protective oil which can be applied to aluminum sheet during rolling and serves the dual purpose of a rolling oil and a water stain inhibitor. Numerous other uses such as the protection of extrusions during storage or shipment prior to anodizing are also possible. Formulations of the protective compositions which satisfy Food and Drug Adminstration requirements and Kosher requirements can also be used on surfaces which contact food and beverages.

The following examples illustrate the invention more fully, however, they are not intended to limit the scope thereof. In these examples all parts and percentages are on a weight basis unless otherwise indicated.

EXAMPLE I

A protective composition was prepared by blending 75 parts $C_{36}$ dibasic acid (Empol 1018 dimer acid containing about 15% trimer acid) and 25 parts glycerol monooleate. The resulting blend has an acid value of 136, hydroxyl value of 49.5 and 100° F. and 210° F. viscosities of 791 and 43.5 centistokes, respectively. 1 Percent, 2%, 4% and 6% solutions (identified as A, B, C, and D, respectively) of the protective composition were prepared by diluting with mineral seal oil (100° F. viscosity 38.6 SUS; boiling range 520–610° F.).

6 × 3 inches Aluminum panels were coated with each of the protective oils. Prior to application of the oil the panels were cleaned with trichlorotrifluoroethane to remove any residual rolling oil. Two methods of application were used to coat the panels. In the first method, hereinafter called the spray method, panels were sprayed with the solution and allowed to stand in a vertical position overnight. This method applies a relatively heavy film of the protective oil to the test panels.

In the second method, hereinafter identified as the weighed film method, several drops of the oil were placed on one side of each previously weighed panel and spread uniformly over the surface with a lint free tissue. Each panel was reweighed and, the film weight adjusted, if necessary, until 5–10 mg of the oil was present on the sheet. The panels were than allowed to stand at ambient temperature and humidity for at least 24 hours to allow the mineral seal oil to evaporate, thus leaving only a thin film of the protective composition on the surface of the aluminum, and reweighed.

To demonstrate the ability of the protective composition to prevent water staining the treated aluminum sheets were subjected to a stream test. For this test 3 × 1.5 inch coupons were cut from the panels and suspended at a distace from 0.5–0.75 inch in front of the side-arm of a 500 ml. filtration flask containing vigorously boiling water. After five minutes exposure the coupon was removed and visually examined. Water stained coupons were than rated from 1 to 5 depending on the diameter of the stain as follows:

1 — <⅛ inch
2 — ⅛ to ¼ inch
3 — >¼ to ½ inch
4 — >½ to ¾ inch
5 — >¾ inch

Results obtained with duplicate samples tested using the above-described procedure are listed below. NS indicates no visible stain.

| Protective Oil | Water Stain Rating | |
|---|---|---|
| | Spray Method | Weighed Film Method |
| A | NS | NS |
| | NS | 1 |
| B | NS | NS |
| | NS | NS |
| C | NS | NS |
| | NS | NS |
| D | NS | NS |
| | NS | NS |

The above results demonstrate that even with very low concentrations of the protective composition it is possible to prevent water staining on the surface of the aluminum even under severe conditions. An untreated control panel as well as a panel treated with the straight mineral seal oil had a water stain rating of five.

EXAMPLE II

Twenty-five parts dimer acid and 75 parts glycerol monooleate were charged to a reactor equipped with a stirrer and condenser fitted with a trap for collecting water and heated under nitrogen at 200° C. for about 3 hours. The resulting product (acid value 17.8, 100° F. viscosity of 174 centistokes and 210° F. viscosity of 18.4 centistokes) was evaluated in accordance with the procedures of Example I. Mineral seal oil solutions containing 1%, 2%, and 6% of the protective composition were prepared, applied to aluminum panels by the spray method and evaluated in the steam test with the following results:

| | Water Stain Rating |
|---|---|
| 1% Protective oil | NS |
| | 2 |
| 2% Protective oil | NS |
| | NS |
| 4% Protective oil | NS |
| | NS |
| 6% Protective oil | NS |
| | NS |

EXAMPLE III

To demonstrate the practical utility of the products of this invention they were applied in an actual plant operation. A 3% (by volume) solution of the protective composition of Example I in mineral seal oil was sprayed onto both sides of 60 × 0.016 inch aluminum sheet traveling at 1150 feet per minute prior to passage through a slitter where the sheet was cut into 20 inch widths and recoiled. The application rate of the protective oil was 75 mg/ft.$^2$ per side and the sheet retained 41 mg/ft.$^2$ oil per side.

Thirteen coupons, each measuring 1.5 × 3 inches, were cut from a 3 × 20 inch strip of the treated sheet obtained from the slitter in order to obtain a profile of water stain protection across the width of the strip. Both sides of each coupon were evaluated using the steam test and the average water stain rating of the twenty-six sides treated was 0.8.

The protective composition was also evaluated using a test designed to approximate conditions encountered when a coil of aluminum is exposed to weather and atmospheric changes such as during storage or shipment. For this test 12 6 × 3 inch coupons were cut from the coil, assembled in a pack and the pack placed between two 6 × 6 × 1 inch aluminum blocks hollowed to permit circulation of water within. To simulate the wraps of a tightly wound coil the blocks were drawn together at the corners to compress the coupons to the pack. The assembly was then placed in a humidity cabinet maintained at about 95° F. and 95–100% relative humidity while 40°–50° F. water was circulated through the blocks for about 6–7 hours. Water circulation was then stopped and the temperature in the cabinet raised to 105° F. with 95–100% relative humidity for 16 hours. The test cycle was repeated as desired. At the completion of the desired number of cycles the individual coupons were removed from the humidity chamber and inspected for the presence of water stains ignoring the two surfaces contacting the aluminum cooling blocks. After four cycles in the humidity chamber, aluminum sheets treated with a 3% (by volume) protective oil prepared using the protective composition of Example I showed no evidence of water staining. The above data clearly show the superior water stain protection obtained with the products of this invention applied under actual plant conditions.

EXAMPLE IV

To further demonstrate the superiority of the products of this invention a commercially available product sold as a protective oil for aluminum was applied in the slitting operation described in Example III at the same rate of application. To obtain acceptable water stain protection it was necessary to use a protective oil containing at least 12% of the protective component (about 52% triglyceride and a small amount of diglyceride, 25% $C_{36}$ dimer acid, 6% $C_{18}$ fatty acids and 13% mixed aliphatic alcohols) in an inert hydrocarbon diluent of the mineral seal oil type. At lower concentrations severe staining was obtained.

Coupons (13) cut from a 20 inch width of the sheet treated with the 12% solution of the commercial product and evaluated on both sides in the steam test had an average water stain rating of 1.9, more than twice that obtained when the aluminum was treated with the 3% protective oil of Example I. These results are even more surprising when one considers that 69 mg/ft$^2$ of the commercial protective oil solution was retained after application. The variation in amount of oil retained is probably the result of slight differences in the viscosity and volatility of the resulting protective oil solutions.

The above results clearly point out the superior water stain protection obtained with the protective compositions of this invention compared to a commercial product applied at a much higher concentration. Even though significantly larger amounts of the commercial oil are retained on the surface of the metal after application, the ability of the commercial product to protect the surface of the aluminum against water staining is significantly lower than that obtained using the protective oils of this invention. The ability of the present products to form a continuous film on the surface of aluminum at very low concentrations when applied to rapidly moving aluminum sheets is extremely advantageous from both a manufacturing and economic standpoint. While they are capable of forming a continuous hydrophobic barrier on the surface of the metal they do not interfere with subsequent annealing operations and are essentially ashless. Additionally, the present products exhibit excellent compatibility with hydrocarbon oils and the resulting products are typically clear homogenous solutions.

EXAMPLE V

Following the procedure of Example II, 75 parts dimer acid and 25 parts of glycerol monooleate were reacted to an acid value of 97.7 and hydroxyl value of 31.1. The protective composition had a 100° F. viscosity of 1975 centistokes and 210° F. viscosity of 101 centistokes. Mineral seal oil solutions containing 2%, 4% and 6% of the oil were prepared and applied to panels of aluminum using the weighed film method. Duplicate panels were evaluated in the steam test with the following results.

|  | Water Stain Rating |
|---|---|
| 2% Protective oil | NS |
|  | 1 |
| 4% Protective oil | NS |
|  | 1 |
| 6% Protective oil | NS |
|  | NS |

A 3% (by volume) solution in mineral oil was prepared and similarly applied to both sides of twelve aluminum panels and the panels evaluated in the humidity chamber. After four test cycles there was no water staining.

EXAMPLE VI

Fifty parts dimer acid and 50 parts glycerol monooleate were reacted to an acid value of 35.0. The reaction product (1071 centistokes at 100° F.) was diluted with a hydrocarbon carrier oil to obtain a 6% (by volume) solution. No water staining was observed with aluminum sheet treated with this protective oil solution after four test cycles in the humidity chamber. Steam test results were also positive, i.e. no staining.

EXAMPLE VII

Similar to Example 1, protective compositions were prepared by blending $C_{36}$ dimer acid and glycerol monooleate. 95/5, 85/15 and 50/50 Blends (parts dimer/parts glycerol monooleate) were prepared, diluted to 1% with mineral seal oil and the protective oil applied to the surface of the freshly rolled aluminum by spraying. All of the blends provided good protection against the formation of water stains when the treated panels were exposed to steam.

EXAMPLE VIII

To demonstrate the ability to employ different dimer acid products, a series of protective compositions were prepared by blending 25 parts glycerol monooleate with 75 parts dimer acid containing varying amounts of trimer acid. The dimer acid products used contained 96%, 87% and 83% dimer with the balance being primarily trimer acid. The protective compositions prepared with each of these dimer products provided excellent protection against water stain formation even under very severe conditions. Aluminum sheet sprayed with 1% protective oil solutions showed no water staining when exposed to the steam test.

EXAMPLE IX

To further demonstrate the versatility of the invention and the ability to obtain useful protective compositions using different polybasic acids. 25 parts glycerol monooleate were blended with 75 parts dibasic acid obtained by the addition of acrylic acid to linoleic acid. The resulting blend was diluted with light hydrocarbon oil and the solution containing 1% of the protective composition applied to aluminum panel by spraying. The treated metal showed no trace of water stain when tested using the steam method. Even when the concentration of the protective oil was reduced to 0.5% excellent resistance to water stain formation was obtained.

EXAMPLE X

Seventy-five parts $C_{36}$ dibasic acid containing about 15% trimer acid were separately blended with 25 parts sorbitan monooleate and 25 parts sorbitan trioleate. These blends were then diluted with mineral seal oil to obtain 0.5% and 1% protective oil solutions having viscosities suitable for spray application. Both the dimer/sorbitan monooleate blend and dimer/sorbitan trioleate blend were highly effective for the prevention of water staining when applied to the surface of an aluminum metal product. A similarly useful blend was obtained using POE (5) sorbitan monooleate, that is, sorbitan monooleate ethoxylated with 5 mols ethylene oxide.

EXAMPLE XI

A blend of 75 parts $C_{36}$ dimer acid and 25 parts pentaerythritol monooleate was prepared and diluted with light mineral oil to obtain 0.5% and 1% protective oil solutions. These compositions provided excellent water stain protection when applied as a continuous film on the surface of aluminum products. No water stains were produced on sheets treated with these protective oils when they were subjected to the steam test.

EXAMPLE XII

Blends of triglycerol diisostearate and dimer acid (25/75) and glycerol monooleate and dimer acid (25/75) were made and diluted with mineral seal oil to obtain a 1% protective oil solution. The solution was applied to aluminum sheet by spraying. Very slight staining (water stain rating — 1) was observed with both products when treated panels were subjected to the steam test. When the concentration of the protective oil was increased to about 2% the level of water protection was proportionately increased and no water staining was observed in the steam test.

EXAMPLE XIII

To further demonstrate the ability to obtain useful protective compositions by either blending or reacting the polybasic acid and polyol partial ester the following experiment was conducted. Fifty parts $C_{36}$ dimer acid and 50 parts glycerol monooleate were combined in a suitably fitted reactor. A sample (A) of the initial reaction mixture was reserved for subsequent testing as a protective agent for aluminum. The reaction mixture was then heated for about 2 hours at 200° C. under a nitrogen atmosphere while removing water of reaction. Samples were drawn from the reactor at 30 minute intervals and the 30 minute, 60 minute, 90 minute and 120 minute reaction products identified as samples B, C, D and E, respectively. The reaction was then forced to virtual completion by applying a vacuum and heating for an additional 2 hour period. The final reaction product (F) and samples A–E were each diluted with mineral seal oil so that the concentration of the protective oil was 1%. Solvent washed aluminum test panels were then sprayed with each of the protective oil solutions, allowed to drain overnight and evaluated in the steam test. Results of the steam test as well as the acid value and hydroxyl value of each of the protective compositions prior to dilution are set forth below.

| Sample | Acid Value | Hydroxyl Value | Water Stain Rating |
|--------|-----------|----------------|---------------------|
| A | 98.4 | 101 | NS |
| B | 71.4 | 77.5 | NS |
| C | 62.8 | 77.6 | 1 |
| D | 51.9 | 61.2 | NS |
| E | 45.8 | 60.8 | NS |
| F | 26.5 | 46.5 | 1 |

We claim:

1. A method in the manufacture, transportation or storage of aluminous metal sheet, wherein water staining of such sheet is prevented by applying to the surface of the sheet, in neat form, a continuous film of at least 0.5 milligram per square foot of a protective composition having a hydroxyl value greater than 15 and consisting essentially of a product derived from:
   (a) an aliphatic or cycloaliphatic polybasic acid containing from 18 to 72 carbon atoms and 2 to 4 carboxyl groups, and
   (b) a polyol partial ester derived from a $C_{12}$–$C_{22}$ aliphatic monocarboxylic acid and a polyol selected from the group consisting of aliphatic polyols and ether polyols obtained by the condensation of two or more aliphatic polyol molecules or by ethoxylation of an aliphatic polyol, said polyols containing from 3 to 30 carbon atoms and 3 to 22 hydroxyl groups, with not more than 70% of the available hydroxyl groups esterified, the weight ratio of (a) to (b) ranging from 20:1 to 1:4.

2. The method of claim 1 wherein (a) is a polymer acid obtained by the polymerization of an unsaturated monocarboxylic acid containing 16 to 26 carbon atoms and (b) is derived from an aliphatic monocarboxylic acid containing 14 to 20 carbon atoms and an aliphatic or ether polyol containing from 3 to 12 carbon atoms and 3 to 10 hydroxyl groups.

3. The method of claim 2 wherein said polyol is selected from the group consisting of glycerol, diglycerol, triglycerol, tetraglycerol, trimethylolpropane, pentaerythritol, dipentaerythritol, tripentaerythritol and tetrapentaerythritol.

4. The method of claim 3 wherein the polymer acid (a) a $C_{36}$ dimer acid containing less than 25% by weight trimer and higher polymer acids and (b) is derived from a $C_{18}$ fatty acid.

5. The method of claim 4 wherein (a) and (b) are blended at a weight ratio of 5:1 to 1:2 and the protective composition has a hydroxyl value between about 25 and 200.

6. The method of claim 4 wherein (a) and (b) are reacted at a weight ratio of 3:1 and 1:3 and the protective composition has a hydroxyl value between about 25 and 200.

7. A method in the manufacture, transportation or storage of aluminous metal sheet, wherein water staining of such sheet is prevented by applying to the surface of the sheet a solution consisting essentially of an inert aliphatic or aromatic hydrocarbon diluent having a 100° F. viscosity of 20 to 100 SUS and at least 0.1 weight percent of a protective composition having a hydroxyl value greater than 15 and derived from:
   (a) an aliphatic or cycloaliphatic polybasic acid containing from 18 to 72 carbon atoms and 2 to 4 carboxyl groups, and (b) a polyol partial ester derived from a $C_{12}$-$C_{22}$ aliphatic monocarboxylic acid and a polyol selected from the group consisting of aliphatic polyols and ether polyols obtained by the condensation of two or more aliphatic polyol molecules or by ethoxylation, said polyols containing from 3 to 30 carbon atoms and 3 to 22 hydroxyl groups, with not more than 70% of the available hydroxyl groups esterified, the weight ratio of (a) to (b) ranging from 20:0 to 1:4, and subsequently evaporating substantially all of said diluent, such that said protective composition is present on the sheet as a continuous film containing at least 0.5 milligram of said protective composition per square foot.

8. The method of claim 7 wherein the sheet is in the form of a strip and after said solution is applied, the strip of sheet is wound to make up a coil and is then transported or stored.

9. The method of claim 8 wherein the protective composition is applied by spraying.

10. The method of claim 7, including the step of annealing the sheet after said solution is applied, wherein the sheet is annealed free from the formation of ash.

11. The method of claim 7 wherein said diluent is mineral oil or mineral seal oil having a 100°0 F. viscosity of 30 to 80 SUS and a flash point greater than 175° C., (a) is a polymer acid obtained by the polymerization of an unsaturated $C_{18}$ monocarboxylic acid and containing at least 75% by weight $C_{36}$ dimer acid, and (b) is derived from a $C_{18}$ fatty acid and a polyol selected from the group consisting of glycerol, diglycerol, triglycerol, tetraglycerol, trimethylolpropane, pentaerythritol, dipentaerythritol, tripentaerythritol and tetrapentaerythritol.

12. The method of claim 11 wherein (a) and (b) are blended at a weight ratio of 5:1 to 1:2 and said protective composition has a hydroxyl value between 25 and 200.

13. The method of claim 11 wherein (b) is glycerol monooleate, trimethylolpropane monooleate or pentaerythritol monooleate.

14. The method of claim 11 wherein (a) and (b) are reacted at a weight ratio of 3:1 to 1:3 and said protective composition has a hydroxyl value between 25 and 200.

15. The method of claim 11 wherein the polymer acid (a) is characterized by having an acid value from 180 to 215, saponification value from 190 to 205 and neutral equivalent from 265 to 310.

* * * * *

UNITED STATES PATENT AND TRADEMARK OFFICE
CERTIFICATE OF CORRECTION

PATENT NO. : 4,122,217

DATED : October 24, 1978

INVENTOR(S) : R.J. Sturwold; W.E. Utz; N. Christ; W.R. Ford, Jr.; G.P. Koch

It is certified that error appears in the above-identified patent and that said Letters Patent are hereby corrected as shown below:

Col. 6, line 21, "as" should read ---at---.
Col. 8, line 49, after "protective", first instance, should be inserted ---composition---.
Col. 9, line 22, "has" should read ---had---.
Col. 9, line 29, "inches" should read ---inch---.
Col. 9, line 55, "distace" should read ---distance---.
Col. 10, line 28, after "2%," insert ---4%---.
Col. 12, line 38, "1" should read ---I---.
Col. 12, line 65, "." should read ---,---.
Col. 14, line 47, after "(a)" should be inserted ---is---.
Col. 15, line 11, "20:0" should read ---20:1---.
Col. 16, line 2, "100°0" should read ---100°---.

Signed and Sealed this

Third Day of July 1979

[SEAL]

Attest:

Attesting Officer

LUTRELLE F. PARKER

Acting Commissioner of Patents and Trademarks